United States Patent [19]

Yarbrough et al.

[11] 4,305,101

[45] Dec. 8, 1981

[54] METHOD AND APPARATUS FOR SELECTIVELY RECORDING A BROADCAST

[75] Inventors: Charles J. Yarbrough, Kenwood; Alan F. Strachan, Santa Rosa; Jo Weisman, Kenwood, all of Calif.

[73] Assignee: Codart, Inc., Santa Rosa, Calif.

[21] Appl. No.: 30,436

[22] Filed: Apr. 16, 1979

[51] Int. Cl.³ .................... G11B 15/18; G11B 5/02
[52] U.S. Cl. .................................................. 360/69
[58] Field of Search ................ 360/69, 60, 15, 35; 358/122, 123

[56] References Cited

U.S. PATENT DOCUMENTS

| 2,527,967 | 10/1950 | Schrader | 360/35 |
| 3,485,946 | 12/1969 | Jackson et al. | 360/35 |
| 4,045,819 | 8/1977 | Goldmark | 360/35 |

FOREIGN PATENT DOCUMENTS 2234791 2/1973 Fed. Rep. of Germany ...... 358/123

OTHER PUBLICATIONS

"Prototype . . . Cassette", Electronics, vol. 49, No. 18, p. 6E, 1976.
Lucazeau, System of Radio Program Supply, Electron. & APP Ind., No. 232, p. 50, 3/1/77.

Primary Examiner—Robert S. Tupper
Attorney, Agent, or Firm—Townsend and Townsend

[57] ABSTRACT

A selective receiving and/or recording technique for broadcast audio and/or video programs where the broadcast signal has a tone code preceding each program segment to which a monitoring-receiving-recording device is responsive, either matching the tone code with a prestored list of orders for receiving and/or recording that broadcast segment or responding to a particular code so as to disable its associated recorder to thus protect copyrighted information.

2 Claims, 5 Drawing Figures

METHOD AND APPARATUS FOR SELECTIVELY RECORDING A BROADCAST

With the growing consumer use of the videotape recorder (VTR) and the already existing use of audio cassette recorders, the distribution and control of both audio and audio-video materials which may be transmitted over the free air or by cable (in either case, broadcast to a large population) is undergoing a revolution. For example, in the case of video-tape recorders, there is at the present time a question as to the control of copyrighted material. Now, there is no technique to prevent the unauthorized copying of copyrighted material except by the outright ban of VTRs for use by the consumer or alternatively, the use of a "pay TV" scheme where a complex decoder to descramble the TV signal must be leased or purchased by the home viewer.

At the same time, with the information explosion and the growing use of computers in the home, the variety of information that can be received in the home has expanded for beyond motion picture and audio records, to, for example, computer programs. Also of course it has been proposed that newspapers be electronically transmitted to the home. Thus, it is desirable that there be a method of selectively monitoring this vast amount of information which comes to the home through broadcasts either by the free air or via cable, to either receive or record desired information. Moreover, this should be done automatically without the immediate attention of the user.

It is therefore a general object of this invention to provide a method of selectively receiving an/or recording a broadcast of an audio and/or video program.

It is an additional object of the invention to provide both apparatus and method for the above where copyrighted material can be broadcast and received only by prior authorization to the home user.

In accordance with the above objects, there is provided a method of selectively receiving and/or recording a broadcast of an audio and/or video program comprising the following steps: first, signals are encoded on program segments to be broadcast which identify the type of segment. The broadcast is monitored and these encoded signals decoded. Then the decoded signals are compared with a pre-stored code at the monitoring location and a predetermined action is taken with respect to this comparison. Such action includes at least one of the following: (1) receiving the broadcast, (2) recording the broadcast, or (3) disabling the operation of any recording equipment at the monitoring location.

In addition, the present invention includes at the monitoring location a technique for preparing and storing a list of different program segment types which are to be subsequently received and recorded when they are finally broadcast.

Figure 1:
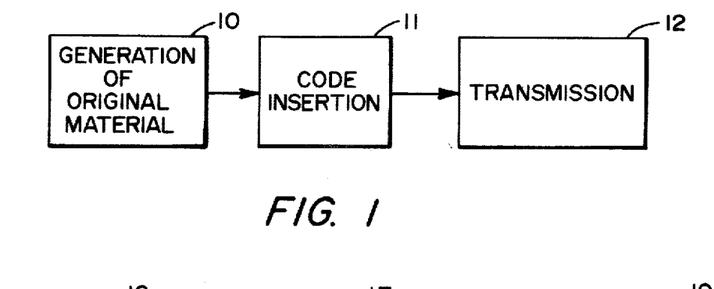
FIG. 1 is a block diagram of the broadcast portion of the method and system of the present invention.

FIG. 1 illustrates the generation and transmission of program material in the block 10. This refers to all production and programming involved in producing audio material to be broadcast over the radio, television material to be broadcast over the free air, and cable and/or telephone line material which can include digital computer programs, for example. In other words, any material which is discusssed above which the home user would have some interest in and would desire to either receive and/or record for later use. After the material is generated, a code is inserted at block 11 which precedes the material and specifically each segment or interval of the material.

Each program segment or interval is categorized as to its nature and content. Code insertion in the preferred embodiment of the present invention is in the form of pairs of tones, which may be exactly equivalent to those used in the telephone touch tone dialing, which are inserted in the audio portion of the material. Such material has encoded material on each of its program segments. In the preferred embodiment of the present invention, there are included eight kinds of messages. The messages consists of a sequence of tone pairs, as discussed above. Relating to the touch tone dialing designations, all messages start with a star and end with a cross-hatched number designation. The messages themselves are variable lengths, the first digit specifying the kind of information which follows. Formats and meanings are as follows, with the messages being coded 1-8 in the first digit:

1—NOT FOR RECORDING
2—COPYRIGHTED MATERIAL: FOLLOWED BY
   F—A ONE DIGIT CODE (1=BEGIN ALL SEGMENTS WITH THE NAME GIVEN BELOW; 2=END OF ALL SEGMENTS; 3=FIRST, LAST AND ONLY SEGMENT; 4=AND MIDDLE SEGMENT).
   DD-A TWO DIGIT DATA CODE
   NAME—A VARIABLE LENGTH STRING OF THE DIGITS 1-9 TERMINATED BY THE DIGIT 0 WHEN IDENTIFIES THE MATERIAL.
3—NON COPYRIGHTED IDENTIFIED MATERIAL: FOLLOWED BY THE NAME IN THE SAME FORMAT AS THE NAME FOR COPYRIGHTED MATERIAL.
4—CHALLENGE: DIRECTIVE TO CHECK FOR TAMPERING IF DEVICE IS NOW RECORDING. THE CHALLENGE IS FOLLOWED BY A ONE DIGIT CODE C—THE KIND OF CHALLENGE (1=NOT FOR RECORDING AT ALL BY ANYBODY; 2=COPYRIGHT MATERIAL, COPYRIGHT PERMISSION REQUIRED)
5—BROADCAST IDENTIFICATION, FOLLOWED BY
   SSSS—A 4 DIGIT STATION NUMBER
   DDDDD—DAY (JAN 1 1979=DAY 1)
   HHMMSS—HOUR,MINUTE,SECOND
6—NEWS, FOLLOWED BY
   L—LEVEL (1=BULLETIN; 2-HEADLINES; 3=DETAILS)
   T—TYPE (1=NATIONAL: 2=LOCAL; 3=BUSINESS; 4=SPORTS; 5=HUMAN INTEREST)
   INSTANCE—A VARIABLE LENGTH CODE LIKE THE NAME CODE FOR COPYRIGHTED MATERIAL.

7—ADVERTISING, FOLLOWED BY
  F—FILTERABLE (1=A SEPARATE AD; 2=TO BE INCLUDED WITH OR FILTERED FROM THE PRECEDING TEXT)
  T—TYPE (1=NEW PRODUCTS; 2=ENTERTAINMENT; 3=SALES; 4=PUBLIC SERVICE; 5=OTHERS)
  INSTANCE—A VARIABLE LENGTH CODE LIKE THE NAME CODE FOR COPYRIGHTED MATERIAL.
8—FEATURES FOLLOWED BY
  T—TYPE (1=PERSONALITY PROFILE; 2=ENTERTAINMENT; 3=HUMAN INTEREST; 4=SCIENCE; 5=PUBLIC AFFAIRS; 6=INVESTIGATIVE REPORTING; 7=TRAVEL; 8=MISCELLANEOUS)
  INSTANCE—A VARIABLE LENGTH CODE LIKE THE NAME CODE FOR COPYRIGHTED MATERIAL.
9—OPEN FOR ADDITIONAL FEATURES.

Thus, in summary, after production of the initial material and before transmission, the material is conceptually broken into intervals or segments with each interval being categorized as to the nature and content. These categories along with other information and punctuation are then coded and the codes translated into combinations of pure tones which are inserted into the audio portion of the material. Examples of a categorizations and information notes for typical segments are as follows:

NEWS, BUSINESS HEADLINES
COPYRIGHTED MUSIC, GREASE, TO BE PLAYED DURING THE WEEK OF JAN 8, 1979
SUPERBOWL XII VIDEO
TODAY'S DATE
MATERIAL NOT FOR RECORDING BY ANYONE
MOVIE COMPLETED (ALL SEGMENTS SHOWN)
MISCELLANEOUS, NOT OTHERWISE CATEGORIZED
ANNOUNCEMENT, FOR ALL SALESPERSONS

Additionally, some intervals may have redundant verification information inserted at points within the interval. Since one method of tampering with the overall operation of the system would be to inject false coded information in lieu of the transmitted code (e.g., insert a code that says the material was free for anyone to record in place of the original code saying that it was copyrighted) this redundant information would enable the monitoring and recording subsystem to detect that the system operation as a whole had been tampered with and to take appropriate measures.

Still referring to FIG. 1 and transmission block 12, the term transmission includes any general dissemination of material which includes radio and TV broadcasting, cable TV transmission, telephone communications and citizen's band (CB) broadcasting.

Figure 2:
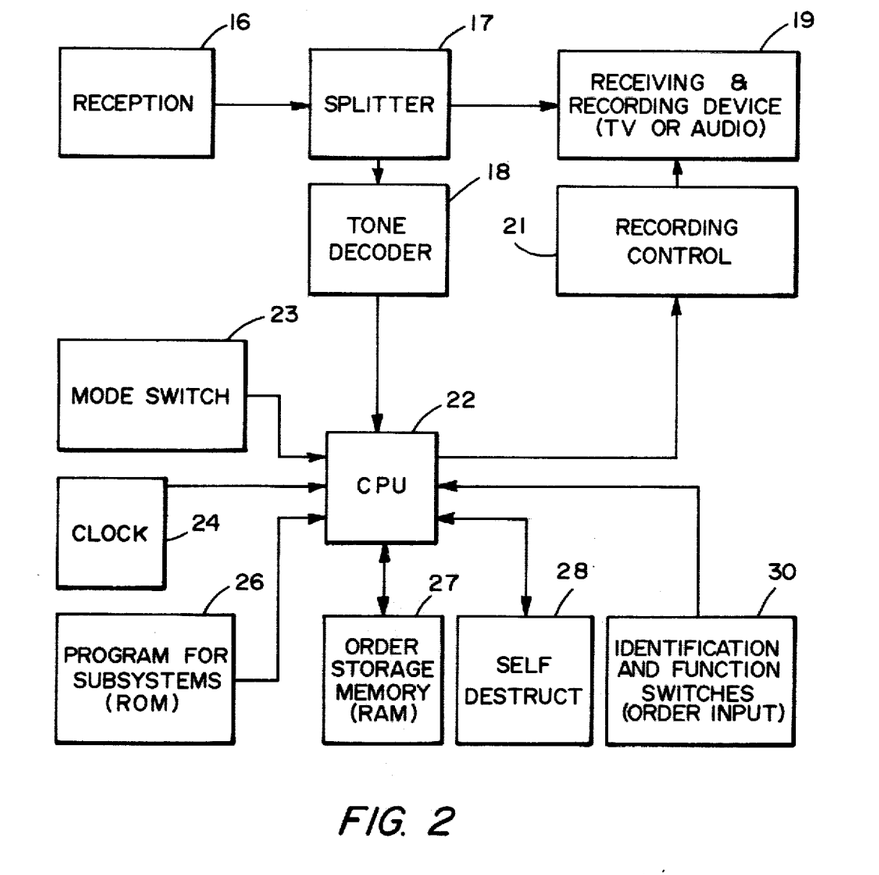
FIG. 2 is a block diagram of the monitoring, receiving and recording portion of the system.

FIG. 2 illustrates a monitoring record, and reception device which typically could include radio or television receiver for receiving a broadcast over the free air or by cable or via an input-output device connected to a telephone line. The encoded touch tone signal, after reception by unit 16, is split out or filtered by the unit 17 which sends the encoded signal to the tone decoder 18 and the informational signal to the receiving and/or recording device 19. Recording device 19 may either be an audio tape recorder (ATR) or a video tape recorder (VTR). There is a recording control unit 21 attached to the recording device 19 which may be used for switching the recording device on or off, switching channels, or scrambling a signal. Recording control unit 21 is controlled by a central processing unit 22 which in the present invention is a Z-80 (Zilog) microprocessor which is part of a Northstar microcomputer system. Such system is programmed in BASIC language as will be explained below.

Figure 5:
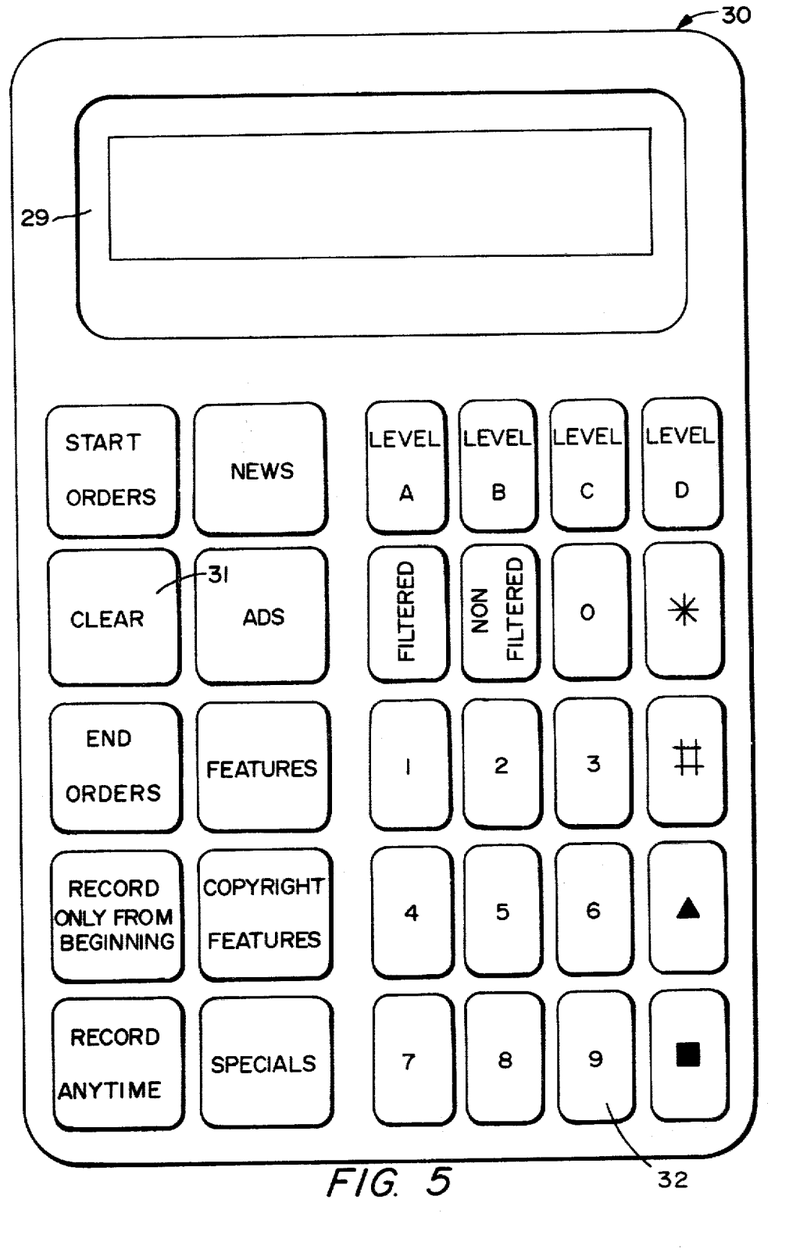
FIG. 5 is an elevation view of a control console with visual readout which is used at the monitoring location.

Block 23 is a mode switch which as indicated may be used for the monitoring unit in a condition to set up a list of orders of different kinds of program segments to be either received and/or recorded and then in its other mode to actually perform the monitoring, recording, and receiving of such ordered broadcast program segments. A clock 24 provides for appropriate timekeeping, for example, to enable such orders as "record any news from 6 to 7 p.m. on Channel 4 and then switch to Channel 3 and record any news between 11 and 11:30 p.m." Block 26 stores programs for the subsystems and is a read only memory (ROM). The subsystems include an order subsystem and also the monitoring subsystem. Random access memory (RAM) 27 provides for the storage of the order messages. The self destruct block 28 relates to optional circuitry which allows the selective receiving system device to disable itself if it detects evidence of tampering. Identification and function switches unit 30 allows the user to input orders, provides an alphanumeric readout and various function switches. These are partially illustrated in FIG. 5 where there is a readout 29 which may be a cathode ray tube or a printer. Various function switches 31 include "start orders" and "end orders" and then the various alphanumeric switches 32 provide for naming or identifying the orders. Other techniques for fabrication of orders could include a magnetic strip which might be inserted into the order input unit 30 and/or a direct input over a phone line.

Referring briefly to the order input which are orders or directives for the future recording operations, examples of such order inputs are the following:
RECORD NEWS HEADLINES ONCE
RECORD ANY TRACK (INTERVAL) FROM THE COPYRIGHTED ALBUM GREASE
RECORD ANY ANNOUNCEMENT UPON COMPLETION OF RECORDING THE MOVIE In general the orders are also coded in a form which mirrors closely the nature and content categories. Possible methods of input for these directives include but are not limited to
DIRECTLY FROM A KEYBOARD
READING THE BEGINNING OF THE TAPE TO BE RECORDED UPON FOR ORDERS ALREADY PLACED THERE
LISTENING TO ORDERS TRANSMITTED OVER THE TELEPHONE This diversity not only facilitates the potential wide spread use of the system, it also enables such possible restrictions as "COPYRIGHT MATERIALS MAY ONLY BE ORDERED VIA MAGNETIC STRIPS (FOR SALE FROM THE COPYRIGHT HOLDER)."

Finally, the identification and function unit 30 may also have a unique machine identification (ID) as well as various preset indicators of the functions which it is authorized to perform. This permits the fabrication of orders destined for use on only particular devices and employs a magnetic code strip authorizing a certain machine to record an album on a certain day. Examples of function switches are "enabled to record news" or "not able to record copyrighted material". In addition, as will be discussed below in accordance with the program listing which is attached as Table I, the identification and function switches 30 are responsive to the various message codes, that is, namely 1-8, especially message code 1 which states that the material is not for recording and which will disable by means of recording control 21, the VTR or ATR recording device 19.

Figure 3:
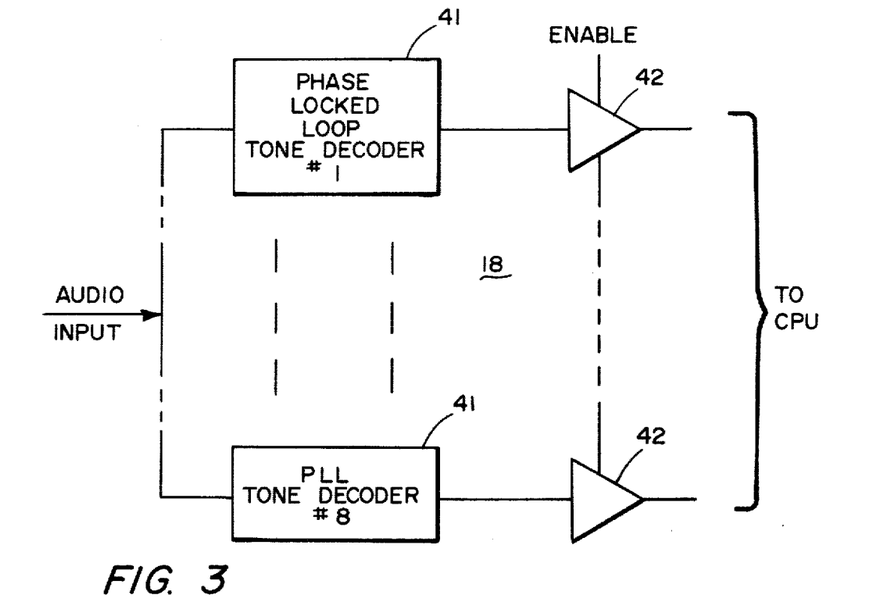
FIG. 3 is a more detailed block diagram of a portion of FIG. 2.
Figure 4:
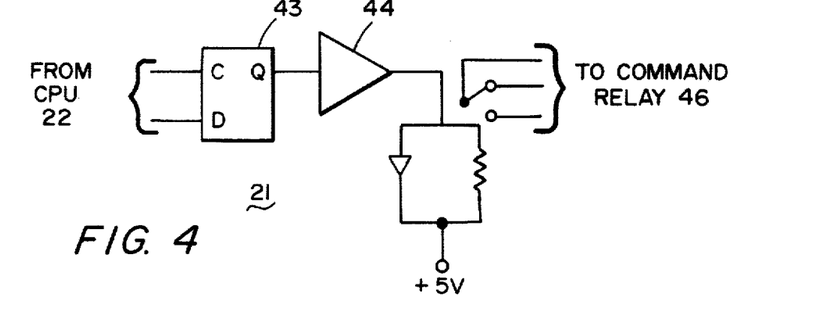
FIG. 4 is a more detailed block diagram of a portion of FIG. 2.

FIGS. 3 and 4 illustrate more detailed schematics of portions of FIG. 2. FIG. 3 is the detailed schematic of a tone decoder 18 which includes 8 phase locked loops 41 which are responsive to the audio filtered input from unit 17 to lock onto one of eight different frequencies. Eight frequencies are used as in the touch tone dialing system to provide frequency pairs giving a total combination of sixteen different possible digits. The output of the phase locked loop tone decoders are passed through amplifiers 42 which are enabled by the CPU 22, FIG. 2, to provide 8 binary input lines to the CPU 22.

FIG. 4 illustrates recording control unit 21 where clock activating signals from CPU 22 activate a flip flop 43 whose Q output is amplified by amplifier 44 to operate a command relay 46. The command relay is connected to the recording device 19 to enable or disable for example, a VTR.

Now referring to the ordering of broadcast program segments which are to be recorded, the user of the system must specify first whether they are adding to the existing order or making an initial order. The input consists of list of orders and the kinds of requests that can be made and the information which is required is as follows:

2—RECORD COPYRIGHTED MATERIAL, FOLLOWED BY THE MACHINE OR DEVICE IDENTIFICATION (ID) AND THE DATE AND NAME OF THE MATERIAL TO BE RECORDED. THIS CAN BE ENCRYPTED.

3—RECORD NON COPYRIGHTED MATERIAL, FOLLOWED BY THE NAME AND A CODE TO SAY WHETHER TO BEGIN ANYWHERE AND RECORD ALL INSTANCES, OR TO WAIT FOR A BEGIN SEGMENT AND RECORD ONLY UNTIL THE FIRST END.

6—RECORD NEWS, FOLLOWED BY LEVEL (1, 1+2, ALL), OR TYPE, OR A LIST OF LEVELS AND TYPES.

7—ADVERTISING, FOLLOWED BY TYPES.

8—FEATURES, FOLLOWED BY TYPES.

The following are three examples of the way in which the system of the present invention may be used:

EXAMPLE 1: "MAGAZINE OF THE AIR." A CABLE TV STATION HAS 4 HOURS OF PROGRAMMING EVERY NIGHT BETWEEN 2 AM AND 6 AM. THE CONTENT OF THE PROGRAM IS A MIXTURE OF GENERAL NEWS, BUSINESS NEWS, ENTERTAINMENT NEWS, SPORTS, ADVERTISING, AND FEATURES SUCH AS BOOK REVIEWS, TRAVEL INFORMATION, PERSONALITY PROFILES OF POLITICAL LEADERS, AND SO ON. A TYPICAL USER WOULD PLACE AN ORDER SUCH AS "ALL BUSINESS NEWS, HEADLINES OF OTHER NEWS, SPORTS (BUT FOOTBALL ONLY), AND ANY INTERVIEWS WITH POLITICAL CANDIDATES." HE THEN LEAVES HIS TV AND VIDEO TAPE RECORDER ON AND UNDER THE CONTROL OF THE SELECTIVE RECORDING SYSTEM, AND HE GOES TO BED. THE NEXT MORNING HE CAN REPLAY A RECORDING WHICH HAS ONLY THE MATERIAL HE WANTED, THAT IS A RECORDING WHICH HAS BEEN CUSTOMIZED TO HIS DESIRES. ANOTHER USER COULD SUBMIT TO HIS SYSTEM DEVICE A COMPLETELY DIFFERENT ORDER, AND SO HAVE A COMPLETELY DIFFERENT RECORDED PROGRAM AWAITING HIM THE NEXT MORNING.

EXAMPLE 2: AUTHORIZING RECORDING OF COPYRIGHTED MATERIALS. AN FM RADIO STATION CONTINUOUSLY BROADCASTS TRACKS FROM HIT ALBUMS. THE TRACKS ARE INTERMIXED, SO THAT NO ONE ALBUM IS EVER PLAYED BY ITSELF. THE TRACKS FROM ANY GIVEN ALBUM ARE, HOWEVER, PLAYED IN ORDER DURING THE COURSE OF THE DAY. MOREOVER, ALL TRACKS ARE PLAYED. A SYSTEM USER WHO WANTS TO RECORD A PARTICULAR ALBUM BUYS A MAGNETIC STRIP UPON WHICH HAS BEEN WRITTEN THE CODE FOR THE ALBUM HE WANTS. OPTIONALLY, IT ALSO HAS THE IDENTIFICATION OF HIS MACHINE (HE PROVIDES THIS AT PURCHASE TIME) AND/OR THE APPROXIMATE DATE ON WHICH HE WISHES TO MAKE THE RECORDING. HE CAN THEN USE HIS CODE STRIP TO DIRECT HIS SYSTEM DEVICE TO RECORD THE ALBUM, FILTERING OUT ALL OF THE EXTRANEOUS MATERIAL. NO OTHER MACHINE, NOR INDEED THIS USER ON A DIFFERENT DATE, CAN USE THE STRIP TO AUTHORIZE THE RECORDING IN THIS APPLICATION THE SYSTEM IS NOT A LOCK AND KEY ON THE COPYRIGHT, RATHER IT FACILITATES A FILTERING PROCESS WHICH THE TYPICAL PERSON WOULD OTHERWISE FIND SO TEDIOUS AS TO PROHIBIT MAKING A COPY OF THE ALBUM BEING BROADCAST.

EXAMPLE 3: A COMPANY INFORMATION SERVICE. A LARGE COMPANY WITH MANY EMPLOYEES CONTINUOUSLY BROADCASTS ITEMS FOR GENERAL DISTRIBUTION. FOR EXAMPLE, "TIME AND LOCATION OF NEXT DISTRICT SALES MANAGERS MEETING," "EMPLOYEE EDUCATION OPPORTUNITIES," "CHANGES IN OVERTIME REGULATIONS FOR MECHANICS," AND SO ON. INDIVIDUALS, OR GROUPS SUCH AS DEPARTMENTS OR EMPLOYEE TYPES, HAVE A RECEIVER WHICH IS CONTINUOUSLY MONITORING THE BROADCAST, EACH WITH A CUSTOMIZED SET OF RECORDING INSTRUCTIONS (INCLUDING THE RECORD ONE TIME ONLY DIRECTIVE), PLAYING THE CURRENT TAPE GIVES THE LISTENER HIS CURRENT AND CUSTOMIZED INFORMATION BULLETIN.

The invention is implemented by a BASIC language program on a Z-80 Zilog microcomputer incorporated in a Northstar computer system. Table I illustrates the various program listings for executing the program.

The following is an explanation of the various program lines.

Lines 1000–1020 define machine identification and the function switches.

1030–1160 define the order of storage and processing areas.

1170–1300 set the initial switch values upon the device being turned on.

1305 make sure the tape recorder is turned off.

1307–1309 say hello to the user.

1310–1970 clear out (that is to say, initialize) the order storage and processing areas.

1980 branches to the initial ordering subsystem.

1990–2110 is a module to write error messages during the orders input.

THE NEXT BLOCK OF MODULES ARE ALL ORDER PROCESSING MODULES.

2250–2850 are designed to process the ordering of copyright material.

2580–2850 are designed to process the orders for non-copyright material.

2860–3230 are designed to process the ordering of news material.

3240–3440 are designed to process the ordering of advertising material.

3450–3650 are designed to process the ordering of feature materials.

3660–3880 are designed to accept the first digit, an order code, decide what type of order it is, and then execute the one of the above modules as appropriate. Referring in detail to the advertising order module 3240–3440, the beginning order line 3240 is the command identifying this module.

3250 is the statement which actually accepts the order. 3260 decides the length of the order, that is, how many items are required. And, then there is a loop in which each item is processed until all the orders are exhausted. That loop in the next set of lines, through 3330, decides whether the next digit in the sequence is either an asterisk indicating "I want all types of advertising" or a digit 1–5, being the only types of advertising currently implemented. If it is anything other than the digits 1–5, it executes an error block. Otherwise, it decides which of the numbers 1–5 it is, and stores that number in the advertising area.

The actual storage is done in either line 3350 in the event it is a single item, for example, record ads of type 2, or in lines 3370 through 3390 in the event that it is an asterisk, saying "give me all types of ads that occur."

2890–4060 is another utility routine designed to display string arrays.

The next several blocks are all display modules to display the materials now ordered and additionally materials already recorded.

4070 to 4220 are the modules to display the copyrighted material, both the orders and recording to date.

4230 to 4380 are the modules to display the non-copyrighted material, both orders and recording to date.

4390 to 4560 are the modules to display the news orders and recording to date.

4570 to 4690 are the modules to display the avertising orders and recording to date; and 4700 to 4830 are the modules to display feature orders and recording.

All of the above modules are designed to print in clear text on the readout 30 (FIG. 5) what pending orders the person has, and in the event that any recording has already happened, what items have been recorded.

The next block is the main function selection, which is designed to decide which of the two subsystems, subsystem 1 or subsystem 2, is to be executed. That is to say, (1) entering orders or (2) recording as well as in utility functions, those utility functions being the display of current status, the display of orders, recording information, and the display of the functions themselves which the device will execute.

The following modules are again Control Modules:

5200–5250 is the module which actually turns the tape recorder on. That is to say, actuates the relay switch.

5260–5300 is the module which turns the tape control off.

This is followed by the input audio monitor routine.

5310–5470 is the routine which listens for a message tone in the audio input.

5480–5600 is the module which decodes a name—that is to say the identification of a particular item from the input.

5610–5720 is the module which decodes a number from the input.

Then comes a set of modules which are designed to process particular kinds of input material.

5730 to 5950 is the module to decide whether a given following piece of copyright material is to be recorded.

5960–6200 is the module to decide whether a given following piece of non-copyrighted material is to be recorded.

6210–6280 is the module to handle a challenge—that is to say a request to verify that the current recording of copyrighted material was in fact authorized, and did not occur as a result of some tampering with the program.

6290–6400 is the module to process a broadcaster identification signal.

6410–6560 is the module to process news material, or identification of news material to decide whether it is to be recorded.

6570–6890 is the module to process feature material.

6900–7170 is the module to monitor the input, wait for a given message, and select the appropriate processing module. The final module is the chief executive force of subsystem 2. That is to say the subsystem which monitors the audio and controls the tape recorder according to the orders already placed by the user and if all of the processing matches the user's request, with two other pieces of information: (1) what is this that follows on the tape; (2) is the information about what has already been recorded. Does the user want every different feature ad that occurs during the day? When we get to a feature ad, we want to decide, not only is the feature ad to be recorded, but have we already recorded it? We record it only in the event that it is a feature ad and one that hasn't already been recorded.

0010–0560 process the 8 line output of tone decoder 18 (FIG. 3) to relate tone pairs to their corresponding "telephone" digits.

The program of Table I was successfully tested with an actual broadcast which was simulated by making a videotape with 15 program segments, each preceded by a coded message, as per the above coding scheme. The tape included advertising features, news, copyright material for purchase, and copyright material not for recording. Order requests were made and it was verified that, for example, when a "one" message code was placed in the broadcast, that the associated VTR was turned off or disabled. Specifically in Table I listing 5330 in stating "CALL (40448)" listens for the message tone representing "ON" via listings 0010-0560 and then turn off the VTR etc. via listings 5260-5300. Thus, the invention provides for both selective reception of broadcast material and also for protection of copyrighted materials by disabling any recording system.

TABLE I

```
1000 REM INTERNAL MACHINE SWITCH SETTINGS
1010 REM MACHINE ID,FILTER STATE,RECORDING CAPABILITY
1020 DATA "12345",0,0,0,1,1,0,1,1,1,1,1
1030 REM DEVICE ID, RECORDING CAPABILITY LIST
1040 DIM D0$(5),R0(9)
1050 REM COPYRIG HMATERIAL ORDERS
1060 DIM C0(10),C1(19),C4(10)
1070 REM NON-COPYRIGHT MATERIAL ORDERS
1080 DIM M0(10),M1(19),M5(10)
1090 REM NEWS ORDERS
1100 DIM N0(2,4),N1(19),N5$(3),N6$(5)
1110 REM ADVERTISING ORDERS
1120 DIM A0(4),A1(19),A5$(5)
1130 REM FEATURE ORDERS
1140 DIM F0(7),F1(19),F5$(8)
1150 REM INPUT STRING, PARAMETER STRING, PARAMETER ARRAY
1160 DIM I$(40),P0$(20),P0(20)
1170 REM INITIALIZE INTERNAL MACHINE SWITCH SETTINGS
1180 REM MACHINE ID,FILTER STATE,RECORDING CAPABILITY
1190 RESTORE
1200 READ D0$
1210 READ F0
1220 FOR I=0 TO 9
1230   READ R0(I)
1240 NEXT I
1250 REM INITIALIZE CURRENT RECORDING STATE, LAST ITEM RECORDED
1260 R0=-1
1270 L0=0
1280 REM INITIALIZE START TONE, STOP TONE, TONE SUBR ADDR
1290 S0=42
1300 S1=35
1305 GOSUB 5260
1307 PRINT "CONART SRS (SELECTIVE RECORDING SYSTEM)"
1308 PRINT "DEMONSTRATION MODEL...VERSION 1.2"
1309 PRINT " "
1310 T0=40448
1320 REM INITIALIZE COPYRIGHT MATERIAL ORDERS
1330 C0=-1
1340 C1=9
1350 FOR I=0 TO C1+1
1360   C0(I)=0
1370   C4(I)=0
1380 NEXT I
1390 REM INITIALIZE NON-COPYRIGHT MATERIAL ORDERS
1400 M0=-1
1410 M1=9
1420 FOR I=0 TO M1+1
1430   M0(I)=0
1440   M5(I)=0
1450 NEXT I
1460 REM INITIALIZE NEWS ORDERS
1470 N5$="RHD"
1480 N6$="NLBSH"
1490 N8=2
1500 N9=4
1510 FOR I=0 TO N8
1520   FOR J=0 TO N9
1530     N0(I,J)=0
1540   NEXT J
1550 NEXT I
1560 REM INITIALIZE AD ORDERS
1570 A5$="NESPO"
1580 N9=4
1590 FOR I=0 TO N9
1600   A0(I)=0
```

```
1610 NEXT I
1620 REM INITIALIZE FEATURE ORDERS
1630 F5$="PEHSAITM"
1640 F9=7
1650 FOR I=0 TO F9
1660    F0(I)=0
1670 NEXT I
1680 REM INITIALIZE COPYRIGHT RECORDING LIST
1690 C2=-1
1700 C3=19
1710 FOR I=0 TO C3
1720    C1(I)=0
1730 NEXT I
1740 REM INITIALIZE NON-COPYRIGHT RECORDING LIST
1750 M2=-1
1760 M3=19
1770 FOR I=0 TO M3
1780    M1(I)=0
1790 NEXT I
1800 REM INITIALIZE NEWS RECORDING LIST
1810 N2=-1
1820 N3=19
1830 FOR I=0 TO N3
1840    N1(I)=0
1850 NEXT I
1860 REM INITIALIZE AD RECORDING LIST
1870 A2=-1
1880 A3=19
1890 FOR I=0 TO A3
1900    A1(I)=0
1910 NEXT I
1920 REM INITIALIZE FEATURE RECORDING LIST
1930 F2=-1
1940 F3=19
1950 FOR I=0 TO F3
1960    F1(I)=0
1970 NEXT I
1980 GOTO 4840
1990 REM RETURN NUMERIC VALUE OF NAME INSTANCE
2000 DEF FNN(S,L)
2010 S2=S
2020 IF S=L THEN 2070
2030 IF I$(S,S)<"0" THEN 2080
2040 IF I$(S,S)>"9" THEN 2080
2050 S=S+1
2060 GOTO 2020
2070 IF I$(S,S)="0" THEN 2100
2080 RETURN -1
2090 GOTO 2110
2100 RETURN VAL(I$(S2,L-1))
2110 FNEND
2120 REM *** ERROR MESSAGE FOR ORDER INPUT
2130 PRINT " - TOO MANY ORDERS"
2140 RETURN
2150 PRINT "ERR: TOO LITTLE INPUT"
2160 RETURN
2170 PRINT "ERR: TOO MUCH INPUT"
2180 RETURN
2190 PRINT "ERR: RE-ENTER ORDER:",
2200 RETURN
2210 PRINT "ERR: INVALID TYPE"
2220 RETURN
2230 PRINT "ERR: INVALID NAME"
2240 RETURN
2250 REM ACCEPT COPYRIGHT ORDERS
2260 IF C0=C1 THEN 2440
2270 INPUT "",I$
2280 L=LEN(I$)
2290 IF L=0 THEN RETURN
2300 IF L<9 THEN 2460
2310 IF L>16 THEN 2480
2320 IF D0$<>I$(1,5) THEN 2500
2330 IF I$(6,6)<"0" THEN 2520
2340 IF I$(6,6)>"9" THEN 2520
```

```
2350 IF I$(7,7)<"0" THEN 2520
2360 IF I$(7,7)>"9" THEN 2520
2370 D=VAL(I$(6,7))
2380 T=FNN(8,L)
2390 IF T<0 THEN 2540
2400 C0=C0+1
2410 C0(C0)=T
2420 C4(C0)=D
2430 RETURN
2440 GOSUB 2130
2450 RETURN
2460 GOSUB 2150
2470 GOTO 2550
2480 GOSUB 2170
2490 GOTO 2550
2500 PRINT "ERR: INVALID DEVICE ID"
2510 GOTO 2550
2520 PRINT "ERR: INVALID DATE"
2530 GOTO 2550
2540 GOSUB 2230
2550 GOSUB 2190
2560 PRINT "C",
2570 GOTO 2270
2580 REM ENTER NON-COPYRIGHT ORDERS
2590 IF M0=M1 THEN 2740
2600 INPUT "",I$
2610 L=LEN(I$)
2620 IF L=0 THEN RETURN
2630 IF L<3 THEN 2760
2640 IF L>10 THEN 2780
2650 IF I$(1,1)<"1" THEN 2800
2660 IF I$(1,1)>"2" THEN 2800
2670 I=VAL(I$(1,1))
2680 T=FNN(2,L)
2690 IF T<0 THEN 2820
2700 M0=M0+1
2710 M0(M0)=T
2720 M5(M0)=I
2730 RETURN
2740 GOSUB 2130
2750 RETURN
2760 GOSUB 2150
2770 GOTO 2830
2780 GOSUB 2170
2790 GOTO 2830
2800 PRINT "ERR: INVALID BEGIN CODE"
2810 GOTO 2830
2820 GOSUB 2230
2830 GOSUB 2190
2840 PRINT "G",
2850 GOTO 2590
2860 REM ENTER NEWS ORDERS
2870 INPUT "",I$
2880 L=LEN(I$)
2890 IF L=0 THEN RETURN
2900 S=1
2910 REM GET NEXT LEVEL/TYPE
2920 IF S+1>L THEN 3150
2930 IF I$(S,S)<"1" THEN 3170
2940 IF I$(S,S)>"3" THEN 3170
2950 I=VAL(I$(S,S))-1
2960 S=S+1
2970 IF I$(S,S)="*" THEN 3050
2980 IF I$(S,S)<"1" THEN 3190
2990 IF I$(S,S)>"5" THEN 3190
3000 J=VAL(I$(S,S))-1
3010 FOR K=0 TO I
3020    H0(K,J)=1
3030 NEXT K
3040 GOTO 3100
3050 FOR K=0 TO I
3060    FOR H=0 TO N9
3070       H0(K,H)=1
3080    NEXT H
3090 NEXT K
```

```
3100 S=S+1
3110 IF S<=L THEN 2910
3120 RETURN
3130 PRINT "ERR: INVALID FORMAT"
3140 GOTO 3210
3150 GOSUB 2150
3160 GOTO 3210
3170 PRINT "ERR: INVALID LEVEL"
3180 GOTO 3210
3190 GOSUB 2210
3200 GOTO 3210
3210 GOSUB 2190
3220 PRINT "H",
3230 GOTO 2870
3240 REM ENTER AD ORDERS
3250 INPUT "",I$
3260 L=LEN(I$)
3270 IF L=0 THEN RETURN
3280 S=0
3290 S=S+1
3300 IF S>L THEN RETURN
3310 IF I$(S,S)="*" THEN 3370
3320 IF I$(S,S)<"1" THEN 3410
3330 IF I$(S,S)>"5" THEN 3410
3340 I=VAL(I$(S,S))-1
3350 A0(I)=1
3360 GOTO 3290
3370 FOR I=0 TO A9
3380    A0(I)=1
3390 NEXT I
3400 GOTO 3290
3410 GOSUB 2210
3420 GOSUB 2190
3430 PRINT "A",
3440 GOTO 3250
3450 REM ENTER FEATURE ORDERS
3460 INPUT "",I$
3470 L=LEN(I$)
3480 IF L=0 THEN RETURN
3490 S=0
3500 S=S+1
3510 IF S>L THEN RETURN
3520 IF I$(S,S)="*" THEN 3580
3530 IF I$(S,S)<"1" THEN 3620
3540 IF I$(S,S)>"8" THEN 3620
3550 I=VAL(I$(S,S))-1
3560 F0(I)=1
3570 GOTO 3500
3580 FOR I=0 TO F9
3590    F0(I)=1
3600 NEXT I
3610 GOTO 3500
3620 GOSUB 2210
3630 GOSUB 2190
3640 PRINT "F",
3650 GOTO 3460
3660 REM GET AN ORDER
3670 INPUT1 "ENTER ORDER:",I$
3680 L=LEN(I$)
3690 IF L=0 THEN RETURN
3700 IF L<>1 THEN 3860
3710 IF I$(1)<>"C" THEN 3740
3720 GOSUB 2250
3730 GOTO 3670
3740 IF I$(1)<>"G" THEN 3770
3750 GOSUB 2580
3760 GOTO 3670
3770 IF I$(1)<>"H" THEN 3800
3780 GOSUB 2860
3790 GOTO 3670
3800 IF I$(1)<>"A" THEN 3830
3810 GOSUB 3240
3820 GOTO 3670
3830 IF I$(1)<>"F" THEN 3860
```

```
3340 GOSUB 3450
3350 GOTO 3670
3860 PRINT
3870 PRINT "ERR: INVALID ORDER"
3880 GOTO 3670
3890 REM PRINT A STRING ARRAY
3900 DEF FNP(N,T)
3910 IF T<2 THEN PRINT P0$,
3920 IF T=0 THEN PRINT " ORDERS"
3930 IF T=1 THEN PRINT " RECORDINGS"
3940 IF N<0 THEN 4050
3950 I=0
3960 J=0
3970 PRINT %8I,P0(I),"  ",
3980 I=I+1
3990 IF I>N THEN 4040
4000 J=J+1
4010 IF J<5 THEN 3970
4020 PRINT
4030 GOTO 3960
4040 PRINT
4050 RETURN 0
4060 FNEND
4070 REM *** PRINT COPYRIGHT ORDERS/RECORDINGS
4080 PRINT
4090 P0$="COPYRIGHT"
4100 FOR I=0 TO C0
4110   P0(I)=C0(I)
4120 NEXT I
4130 P=FNP(C0,0)
4140 PRINT "  DATES"
4150 FOR I=0 TO C0
4160   P0(I)=C4(I)
4170 NEXT I
4180 P=FNP(C0,2)
4190 FOR I=0 TO C2
4200   P0(I)=C1(I)
4210 NEXT I
4220 P=FNP(C2,1)
4230 REM *** PRINT NON-COPYRIGHT ORDERS/RECORDINGS
4240 P0$="NON-COPYRIGHT"
4250 PRINT
4260 FOR I=0 TO M0
4270   P0(I)=M0(I)
4280 NEXT I
4290 P=FNP(M0,0)
4300 PRINT "  BEGIN POINTS"
4310 FOR I=0 TO M0
4320   P0(I)=M5(I)
4330 NEXT I
4340 P=FNP(M0,2)
4350 FOR I=0 TO M2
4360   P0(I)=M1(I)
4370 NEXT I
4380 P=FNP(M2,1)
4390 REM *** PRINT NEWS ORDERS/RECORDINGS
4400 PRINT
4410 P0$="NEWS"
4420 PRINT P0$," ORDERS"
4430 FOR I=0 TO N8
4440   PRINT N5$(I+1,I+1),"-",
4450   FOR J=0 TO N9
4460     IF N0(I,J)=0 THEN 4490
4470     PRINT N6$(J+1,J+1)," ",
4480     GOTO 4500
4490     PRINT "  ",
4500   NEXT J
4510   PRINT
4520 NEXT I
4530 FOR I=0 TO N2
4540   P0(I)=N1(I)
4550 NEXT I
4560 P=FNP(N2,1)
4570 REM *** PRINT ADVERTISING ORDERS/RECORDINGS
```

```
4580 PRINT
4590 P0$="ADVERTISING"
4600 PRINT P0$," ORDERS"
4610 FOR I=0 TO A9
4620   IF A0(I)=0 THEN 4640
4630     PRINT A5$(I+1,I+1)," ",
4640 NEXT I
4650 PRINT
4660 FOR I=0 TO A2
4670   P0(I)=H1(I)
4680 NEXT I
4690 P=FNP(A2,1)
4700 REM *** PRINT FEATURE ORDERS/RECORDINGS
4710 PRINT
4720 P0$="FEATURE"
4730 PRINT P0$," ORDERS"
4740 FOR I=0 TO F9
4750   IF F0(I)=0 THEN 4770
4760     PRINT F5$(I+1,I+1)," ",
4770 NEXT I
4780 PRINT
4790 FOR I=0 TO F2
4800   P0(I)=F1(I)
4810 NEXT I
4820 P=FNP(F2,1)
4830 RETURN
4840 REM MAIN LOOP
4850 PRINT
4860 INPUT1 "ENTER FUNCTION:",I$
4870 L=LEN(I$)
4880 IF L=0 THEN STOP
4890 IF L<>1 THEN 5080
4900 IF I$(1)<>"C" THEN 4930
4910 PRINT "LEAR ORDERS"
4920 GOTO 1250
4930 IF I$(1)<>"N" THEN 4960
4940 PRINT "EW RECORDINGS"
4950 GOTO 1680
4960 IF I$(1)<>"D" THEN 5000
4970 PRINT "ISPLAY ORDERS"
4980 GOSUB 4070
4990 GOTO 4850
5000 IF I$(1)<>"E" THEN 5040
5010 PRINT "NTER ORDERS"
5020 GOSUB 3660
5030 GOTO 4850
5040 IF I$(1)<>"R" THEN 5080
5050 PRINT "ECORDING"
5060 GOSUB 6900
5070 GOTO 4850
5080 IF I$(1)<>"H" THEN 5100
5090 PRINT "ELP"
5100 PRINT
5110 PRINT "FUNCTIONS:"
5120 PRINT "   C-LEAR ORDERS"
5130 PRINT "   N-EW RECORDINGS"
5140 PRINT "   D-ISPLAY ORDERS/RECORDINGS"
5150 PRINT "   E-NTER ORDERS"
5160 PRINT "   R-ECORD"
5170 PRINT "   H-ELP"
5180 PRINT "    -STOP"
5190 GOTO 4850
5200 REM *** TURN TAPE ON
5210 PRINT "TAPE ON"
5220 L0=1
5230 R0=R1
5240 G=CALL(40931)
5250 RETURN
5260 REM *** TURN TAPE OFF
5270 PRINT "TAPE OFF"
5280 IF R0<>-1 THEN R0=0
5290 G=CALL(40928)
5300 RETURN
5310 REM *** GET A TONE
```

```
5320 DEF FNT(T0)
5330 G=CALL(40448)
5340 IF G=S0 THEN 5430
5350 IF G=S1 THEN 5450
5360 IF G<48 THEN 5410
5370 IF G>57 THEN 5410
5375 G=G-48
5380 PRINT "RETURNING",G
5390 RETURN G
5400 GOTO 5460
5410 PRINT "ERR: INVALID TONE"
5420 GOTO 5330
5430 RETURN S0
5440 GOTO 5460
5450 RETURN S1
5460 REM RETURN CALL(T0)
5470 FNEND
5480 REM *** GET A NAME INSTANCE
5490 DEF FNU(D)
5500 U=0
5510 D=FNT(T0)
5520 IF D=0 THEN 5580
5530 IF D>9 THEN 5560
5540 U=U*10+D
5550 IF U<=99999999 THEN 5510
5560 RETURN -1
5570 GOTO 5600
5580 IF FNT(T0)<>S1 THEN 5560
5590 RETURN U
5600 FNEND
5610 REM *** GET A N DIGIT NUMBER
5620 DEF FND(N)
5630 U=0
5640 FOR Q=1 TO N
5650    D=FNT(T0)
5660    IF D>9 THEN 5710
5670    U=U*10+D
5680 NEXT Q
5690 RETURN U
5700 GOTO 5720
5710 RETURN -1
5720 FNEND
5730 REM *** PROCESS COPYRIGHT MATERIAL
5740 L0=0
5750 J=FND(1)
5760 IF (J<1) OR (J>4) THEN RETURN
5770 D=FND(2)
5780 IF D<0 THEN RETURN
5790 T=FNU(T0)
5800 IF T<0 THEN RETURN
5810 FOR I=0 TO C0
5820    IF (D=C4(I)) AND (T=C0(I)) THEN 5850
5830 NEXT I
5840 RETURN
5850 IF J=4 THEN 5940
5860 FOR K=I+1 TO C0+1
5870    C0(K-1)=C0(K)
5880    C4(K-1)=C4(K)
5890 NEXT K
5900 C0=C0-1
5910 IF C2=C3 THEN C2=-1
5920 C2=C2+1
5930 C1(C2)=T
5940 GOSUB 5200
5950 RETURN
5960 REM *** PROCESS NON-COPYRIGHT MATERIAL
5970 L0=0
5980 J=FND(1)
5990 IF (J<0) OR (J>3) THEN RETURN
6000 T=FNU(T0)
6010 IF T<0 THEN RETURN
6020 FOR I=0 TO M0
6030    IF T=M0(I) THEN 6060
6040 NEXT I
6050 RETURN
6060 IF (M5(I)=1) AND ((J=2) OR (J=4)) THEN RETURN
```

```
6070 IF J<>1 THEN 6100
6080 M5(I)=2
6090 GOTO 6190
6100 IF J=4 THEN 6190
6110 FOR K=I+1 TO M0+1
6120    M0(K-1)=M0(K)
6130    M5(K-1)=M5(K)
6140 NEXT K
6150 M0=M0-1
6160 IF M2=M3 THEN M2=-1
6170 M2=M2+1
6180 M1(M2)=T
6190 GOSUB 5200
6200 RETURN
6210 REM *** PROCESS CHALLENGE
6220 T=FND(1)
6230 IF (T<1) OR (T>2) THEN RETURN
6240 IF (T=1) AND (R0>0) THEN 6270
6250 IF (T=2) AND (R0=1) THEN 6270
6260 RETURN
6270 PRINT "UNAUTHORIZED RECORDING"
6280 STOP
6290 REM *** PROCESS BROADCAST ID
6300 T=FND(4)
6310 IF T<0 THEN RETURN
6320 P0$=STR$(T)
6330 T=FND(5)
6340 IF T<0 THEN RETURN
6350 P0$=P0$+" "+STR$(T)
6360 T=FND(6)
6370 IF T<0 THEN RETURN
6380 P0$=P0$+" "+STR$(T)
6390 PRINT "STATION: ",P0$
6400 RETURN
6410 REM *** PROCESS NEWS MATERIAL
6420 L0=0
6430 I=FND(1)-1
6440 IF (I<0) OR (I>N8) THEN RETURN
6450 J=FND(1)-1
6455 IF J<0 OR J>N9 THEN RETURN
6460 IF N0(I,J)=0 THEN RETURN
6470 T=FNU(T0)
6480 IF T<0 THEN RETURN
6490 FOR I=0 TO N2
6500    IF T=N1(I) THEN RETURN
6510 NEXT I
6520 IF N2=N3 THEN N2=-1
6530 N2=N2+1
6540 N1(N2)=T
6550 GOSUB 5200
6560 RETURN
6570 REM *** PROCESS AD MATERIAL
6580 I=FND(1)
6590 IF (I=1) OR (I=2) THEN 6620
6600 L0=0
6610 RETURN
6620 IF (I=2) AND (F0=1) AND (L0=1) THEN 6710
6630 L0=0
6640 I=FND(1)-1
6645 IF I<0 OR I>A9 THEN RETURN
6650 IF (A0(I)=0) THEN RETURN
6660 T=FNU(T0)
6670 IF T<0 THEN RETURN
6680 FOR I=0 TO A2
6690    IF T=A1(I) THEN RETURN
6700 NEXT I
6710 IF A2=A3 THEN A2=-1
6720 A2=A2+1
6730 A1(A2)=T
6740 GOSUB 5200
6750 RETURN
6760 REM *** PROCESS FEATURE MATERIAL
6770 L0=0
6780 I=FND(1)-1
6790 IF (I<0) OR (I>F9) OR (F0(I)=0) THEN RETURN
```

```
6800 T=FNU(T0)
6810 IF T<0 THEN RETURN
6820 FOR I=0 TO F2
6830   IF T=F1(I) THEN RETURN
6840 NEXT I
6850 IF F2=F3 THEN F2=-1
6860 F2=F2+1
6870 F1(F2)=T
6880 GOSUB 5200
6890 RETURN
6900 REM *** MAIN RECORDING LOOP
6910 GOSUB 5260
6920 PRINT "WAITING FOR A MESSAGE"
6930 I=FNT(T0)
6940 IF I<>S0 THEN 6930
6945 GOSUB 5260
6946 IF C0+M0+N0+A0+E0=-5 THEN P0=-1
6947 I=FNT(T0)
6949 IF I=S0 THEN 6947
6960 R1=I
6965 PRINT "WORKING ON",R1
6970 IF R1=0 THEN RETURN
6980 IF (R1<=0) OR (R1>9) THEN 6920
7010 ON R1 GOTO 7020,7030,7050,7070,7090,7110,7130,7150,7170
7020 GOTO 6920
7030 GOSUB 5730
7040 GOTO 6920
7050 GOSUB 5960
7060 GOTO 6920
7070 GOSUB 6210
7080 GOTO 6920
7090 GOSUB 6290
7100 GOTO 6920
7110 GOSUB 6410
7120 GOTO 6920
7130 GOSUB 6570
7140 GOTO 6920
7150 GOSUB 6760
7160 GOTO 6920
7170 GOTO 6920
7180 END
READY
0010 * GDIG -- CALL IT, AND IT WILL RETURN ONLY WHEN IT HAS A GOOD DIGIT
0020 * READ.  RETURN WILL BE A SINGLE CHARACTER IN A.
0030 GDIG    IN    0F0H
0040         ORA   A
0050         JZ    GDIG
0060         MOV   B,A
0070         MVI   C,10
0080 GDIG1   CALL  GDEL
0090         IN    0F0H
0100         CMP   B
0110         JNZ   GDIG
0120         DCR   C
0130         JNZ   GDIG1
0140         LXI   H,GTAB
0150         ADD   L
0160         MOV   L,A
0170         JNC   $+4
0180         INR   H
0190         MOV   A,M
0200         CPI   20H   IF NOT VALID, TRY AGAIN
0210         JZ    GDIG
0220         CPI   2AH   RETURN A '*' IMMEDIATELY
0230         JZ    GRET
0240         IN    0F0H
0250         CMP   B
0260         JZ    $-3   WAIT TILL INPUT CHANGES
0270         CALL  GDEL  AND 3 MS MORE
0280         CALL  GDEL
0290         CALL  GDEL
0300         MOV   A,M
0310 GRET    MVI   H,0
0320         MOV   L,A
0330         RET
```

```
0340  GDEL    PUSH    PSW    DELAY FOR 1 MILLISECOND
0350          MOV     H
0360          DCR     H
0370          JNZ     $-1
0380          MVI     H,25
0390          DCR     H
0400          JNZ     $-1
0410          POP     PSW
0420          RET
0430  GTAB    DB      '              14 7 *      '
0440          DB      ' 25 8       0             '
0450          DB      ' 36 9       *             '
0460          DB      '                          '
0470          DB      ' HB C       0             '
0480          DB      '                          '
0490          DB      '                          '
0500          DB      '                          '
0510  *
0520          ORG     0016+480
0530  ON      OUT     0F1H
0540          RET
0550  OFF     OUT     0F0H
0560          RET

P0
```

What is claimed is:

1. A method of selectively recording a broadcast of an audio and/or video program comprising the following steps:

dividing each of a plurality of programs to be broadcast into segments, no one segment comprising a complete portion of any one program;

placing a coded signal on each of the segments, the coded signal identifying the segment;

intermixing the segments from different programs to prevent any two consecutive segments from comprising a complete portion of any one program;

broadcasting the intermixed segments;

receiving the broadcast segments at a desired location;

electronically decoded the coded signal on each segment;

electronically comparing the decoded signals with at least one pre-stored code at the location where the broadcast signals are received;

automatically recording those segments having decoded signals corresponding to the at least one pre-stored code and automatically not recording those segments having decoded signals not corresponding to the at least one pre-stored code.

2. Apparatus for selectively recording a broadcast of an audio and/or video program wherein the broadcast comprises a plurality of segments, each segment having a coded signal identifying the segment, no one segment comprising a complete portion of any one program, and the segments being intermixed from different programs to prevent any two consecutive segments from comprising a complete portion of any one program, wherein the apparatus comprises:

receiving means for receiving the broadcast;

electronic decoding means connected to the receiving means for decoding the coded signals;

electronic comparison means connected to the decoding means for comparing the decoded signals with a pre-stored code;

recording means for recording the broadcast signals connected to the means for decoding; and automatic activating means connected to the comparison means and to the recording means for controlling the recording means to permit recording the segment when the prestored code and the decoded signal correspond, and to prevent recording the segment when the pre-stored code and the decoded signal do not correspond.

* * * * *